United States Patent [19]

Gillespie

[11] 4,339,049
[45] Jul. 13, 1982

[54] CONTAINERS FOR USE IN A SELF SUPPORTING ASSEMBLY

[75] Inventor: Peter J. Gillespie, Barrington, Ill.

[73] Assignee: The United States of America as represented by the United States Department of Energy, Washington, D.C.

[21] Appl. No.: 141,075

[22] Filed: Apr. 17, 1980

[51] Int. Cl.³ .............................................. B65D 21/02
[52] U.S. Cl. ................................................... 220/23.4
[58] Field of Search ........................ 220/23.4; 206/504

[56] References Cited

U.S. PATENT DOCUMENTS

| | | | |
|---|---|---|---|
| 2,812,099 | 11/1957 | Eugan | 220/23.4 |
| 2,980,751 | 4/1961 | Toce . | |
| 3,147,151 | 9/1963 | Toce . | |
| 3,167,458 | 1/1965 | Brazell | 220/23.4 |
| 3,338,452 | 8/1967 | Oakley . | |
| 3,341,053 | 9/1967 | Keene | 220/23.4 |
| 3,745,048 | 7/1923 | Dinkler . | |
| 3,767,468 | 10/1973 | Schusler . | |
| 3,933,268 | 1/1976 | Baske | 220/23.4 |
| 3,944,074 | 3/1976 | Riley | 220/23.4 |
| 4,113,926 | 9/1978 | McBrien . | |

FOREIGN PATENT DOCUMENTS 243356 2/1963 Australia .
103551 1/1966 Denmark .......................... 220/23.4

Primary Examiner—George E. Lowrance

[57] ABSTRACT

This invention is directed to a container having side walls and end walls forming a body having a generally rectangular cross-section. Means for restraining lateral and rotational movement of the container relative to an adjacent container while allowing relatively unhindered movement perpendicular to the side walls is also included. The lateral and rotational movement is restrained in a plane parallel to the side walls. The means include a projection connected to at least one of the side walls and extending outwardly therefrom to engage the adjacent container.

Also part of this invention is an assembly of containers which includes a plurality of the above described containers arranged side by side with the end walls generally coplanar and the side walls generally parallel. Means for restraining movement perpendicular to the side walls of the plurality of containers is also included. Each of the containers may house a plurality of battery electrodes.

2 Claims, 6 Drawing Figures

CONTAINERS FOR USE IN A SELF SUPPORTING ASSEMBLY

The Government of the United States of America has rights in this invention pursuant to contract No. 31-109-38-4200 awarded by the Department of Energy.

BACKGROUND OF THE INVENTION

This invention relates to a container which has means for engaging additional containers so that they may form a single self-supporting assembly. More particularly, this invention relates to battery cell containers which house battery electrodes to form a multi-cell battery when assembled.

While the containers of this invention have many fields of application and may successfully be used to house various objects, they are particularly useful for housing battery electrodes to be assembled into a multi-cell battery. It should be understood, however, that the present invention is not limited to this particular field of application.

The assembly of batteries with multi-cell construction is well known in the art. However, the method of supporting the assembly of cells as a unit has always been dependent upon relatively complex devices. An example of such a device is disclosed in the patent to McBrien, U.S. Pat. No. 4,113,926. The large number of pieces required to hold the cells together lengthens assembly time and adds to the battery weight which cannot be used for storing energy. Besides the inconveniences created by extra space used by the device, it is not easily adaptable to varying numbers of cells. Additionally, it may be desirable to allow a fluid to flow between the cells for cooling or heating. The versatility of an assembly is limited if it is necessary to have hardware positioned in the space between the cells which restricts the flow of a fluid.

Another problem is caused by the known tendency of battery electrodes to swell and expand during use. The container which houses the battery electrodes must provide resistance against the face of the electrodes to prevent the swelling. If the resistance is insufficient, the electrodes may fracture between areas which are restrained and those areas which swell. It is undesirable to have the added weight of heavy walled containers to restrain the swelling. Nor is it feasible to have the containers assembled flush with one another if space between the containers is necessary to allow a fluid to flow.

SUMMARY OF THE INVENTION

The container incorporated in this invention includes side walls and end walls forming a body having a generally rectangular cross-section. Means are also provided for restraining longitudinal, lateral and rotational movement of the container relative to an adjacent container while allowing relatively unhindered movement perpendicular to the side walls. The aforesaid lateral and rotational movement is restrained in a plane parallel to the side walls. At least one of the side walls is connected to the aforesaid means.

Another embodiment of the container contemplated by this invention includes side walls and end walls forming a body having a generally rectangular cross-section. Means for restraining longitudinal lateral and rotational movement of the container relative to an adjacent container are also included. As previously mentioned, the lateral and rotational movement is restrained in a plane parallel to the side walls. The means includes a projection connected to at least one of the side walls and extending outwardly therefrom to engage the adjacent container. The means may further include each of said projections having a mating member which is connected to the side wall and symmetrically positioned relative to the projection about an axis lying in the plane of the side wall and bisecting the side wall.

An assembly of containers is also part of this invention which includes a plurality of containers, each having side walls and end walls forming a body having a generally rectangular cross-section. The plurality of containers are arranged side by side with the end walls generally coplanar and the side walls generally parallel. Means for restraining longitudinal lateral and rotational movement of the plurality of containers in a plane parallel to the side walls is also included. The means includes a projection connected to at least one of the side walls for each container and extending outwardly therefrom to engage the adjacent container. The assembly of containers also includes means for restraining movement perpendicular to the side walls of the plurality of containers. Additionally, each of the containers may house a plurality of battery electrodes.

It is an object of this invention to provide an improved means for supporting two or more containers together in an assembly.

Another object is to provide a container which will be easily attached or detached from an adjacent container.

Still another object is to provide a container which may be easily and economically produced.

A further object is to provide a container with means which resists movement in a plane parallel to a side wall while simultaneously allowing relatively unhindered movement perpendicular to the side wall.

A still further object is to provide an assembly of containers which require relatively few parts for assembly.

Another object is to provide an assembly of containers which may be easily adapted to various numbers of containers.

Still another object is to provide an assembly of containers which permits a fluid to flow through passages between adjacent containers.

A further object is to provide an assembly of containers which allow easy replacement of an individual container in an assembly after removing the means restraining movement of the containers perpendicular to the side walls of the containers.

A still further object is to provide an assembly of containers which prevents swelling of the side walls of the containers by providing support for the face of each side wall; thus, when the containers house objects like battery electrodes, the breaking of the electrodes from distortion will be prevented.

The invention will be better understood from the description of several embodiments thereof, illustrated in the accompanying drawings.

DETAILED DESCRIPTION OF THE INVENTION

Figure 1:
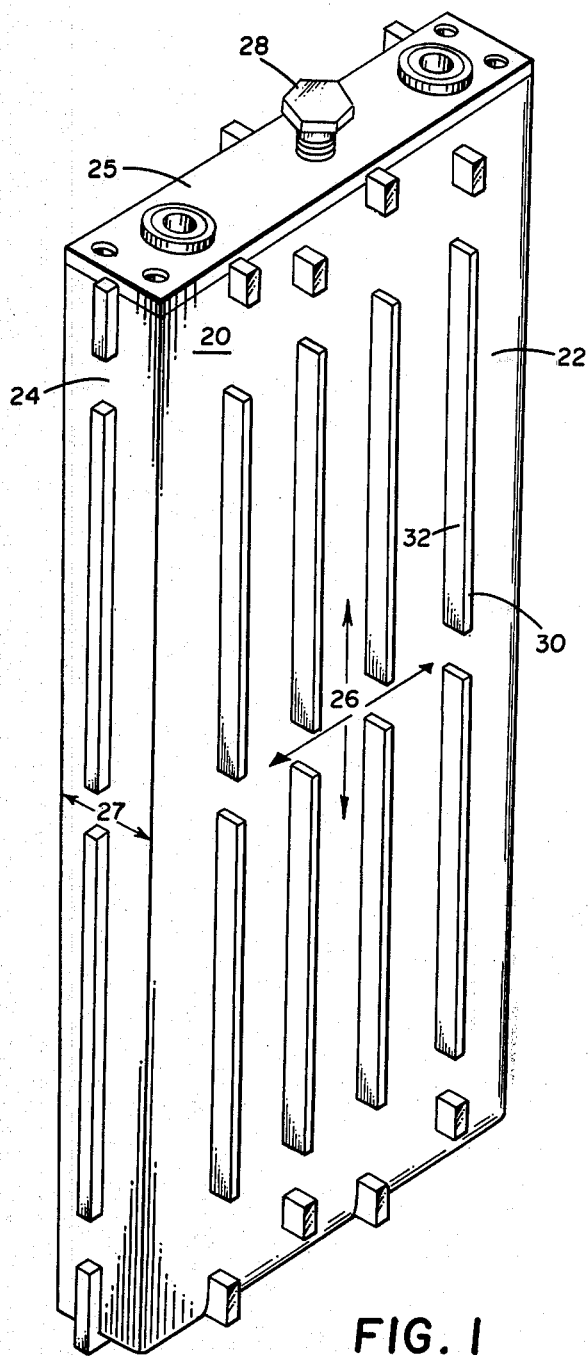
FIG. 1 is a perspective view of a container including the features of the present invention.

FIG. 1 depicts a preferred embodiment of a container included in this invention. The container 20 is defined by side walls, one illustrated as 22, and end walls such as 24 and 25, to form a body having a generally rectangular cross-section. The container 20 includes means for restraining lateral and rotational movement of the container relative to an adjacent container in a plane parallel to the side wall 22 as illustrated by arrows 26. Simultaneously, the means allow relatively unhindered movement perpendicular to the side wall 22 in the direction illustrated by arrows 27. The means is connected to at least one of the side walls on the container.

Figure 5:
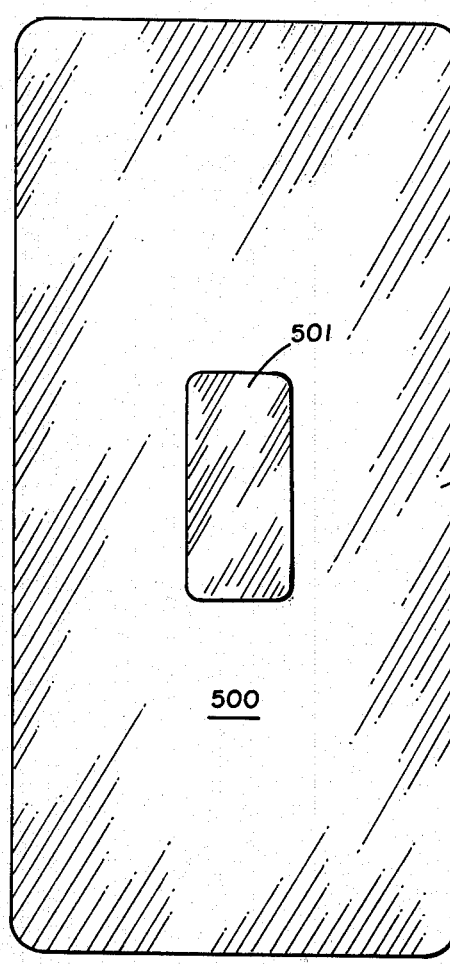
FIG. 5 is a full view of an alternate embodiment of a container including the features of the present invention.
Figure 6:
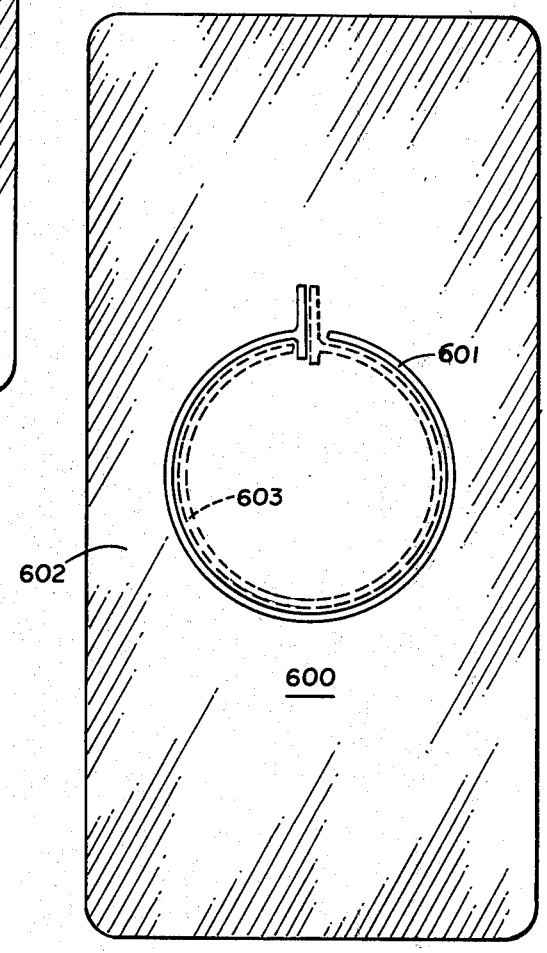
FIG. 6 is a full view of an alternate embodiment of a container including the features of the present invention.

In the preferred embodiment, the means includes a projection, such as rib 30, connected to at least one of the side walls and extending outwardly therefrom to engage the adjacent container. It should be understood that the shape of the projection is not intended to be limited to that depicted by FIG 1. Instead, other shapes which engage an adjacent container to restrain lateral and rotational movement of the container relative to an adjacent container are contemplated by the present invention. Simultaneously, these shapes allow unhindered movement perpendicular to the side wall. For instance, the full view of container 500 in FIG. 5 shows an oblong projection 501 extending outwardly from the side wall 502 to engage a corresponding oblong depression in an adjacent container. Another configuration is illustrated by the full view of container 600 in FIG. 6. A continuous rib-like projection 601 extends outwardly from the side wall 602 to engage a corresponding rib-like projection 603, shown in phantom, on an adjacent container. The projection 601 nearly forms a complete circle.

Figure 2:
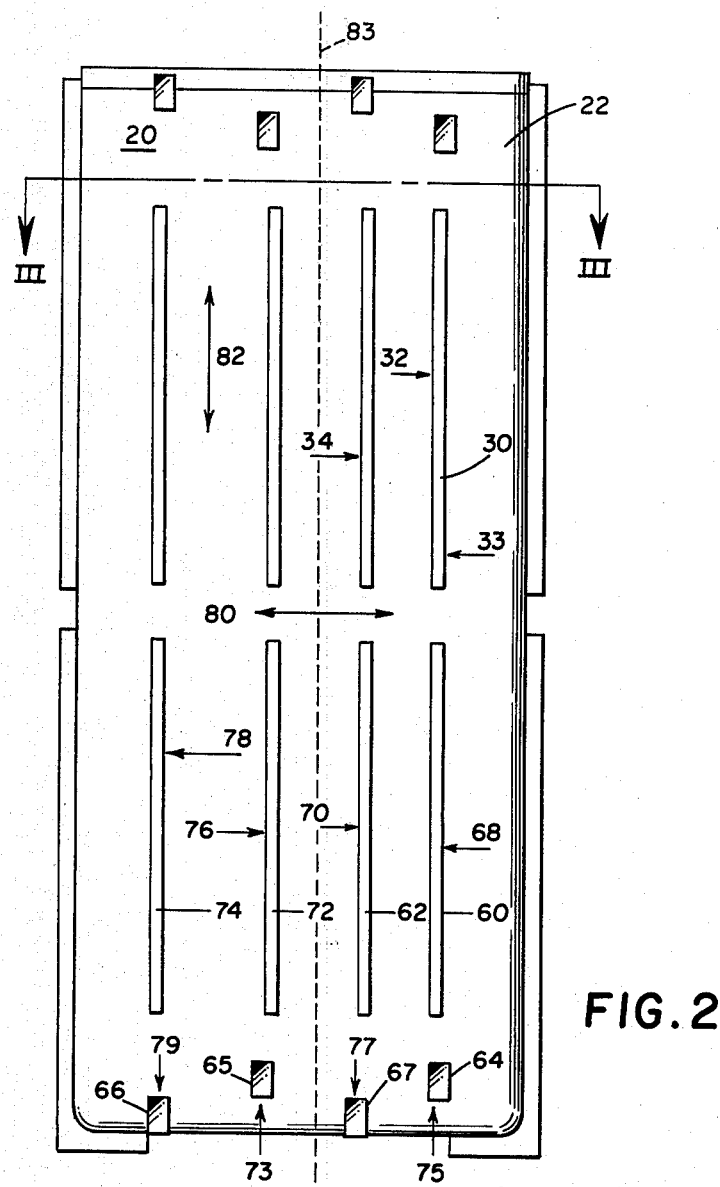
FIG. 2 is a full view of the container of FIG. 1 including the features of the present invention.

FIG. 2 illustrates the full view of FIG. 1. In the more preferred embodiment, the projection includes a plurality of ribs. The ribs, for example rib 30, have a generally rectangular cross-section with two rectangular sides 32 and 33 extending outwardly from the surface of the side wall 22. The rectangular side 33 is a contact surface which engages an adjacent container to restrain lateral and rotational movement of the container relative to an adjacent container in a plane parallel to the side wall 22. The ribs may be categorized by the function of their contact surfaces and divided into a first and second plurality of ribs. The first plurality of ribs, represented by 60 and 62 or 72 and 74 are paired with each other. Additionally, contact surfaces 68 and 70 or 76 and 78 are parallel to each other. A second plurality of ribs include rib-like end posts 64 and 67 or 65 and 66. The rib-like end posts are also paired with each other and contact surfaces 75 and 77 or 73 and 79 are parallel. The contact surfaces of the first plurality of ribs are generally perpendicular to the contact surfaces of the second plurality of ribs. When two containers are brought into contact with each other, the contact surfaces of the various ribs engage corresponding contact surfaces on the adjacent container to restrain lateral and rotational movement in a plane parallel to the side walls. This engagement is described in the discussion of FIG. 3 below.

Figure 3:
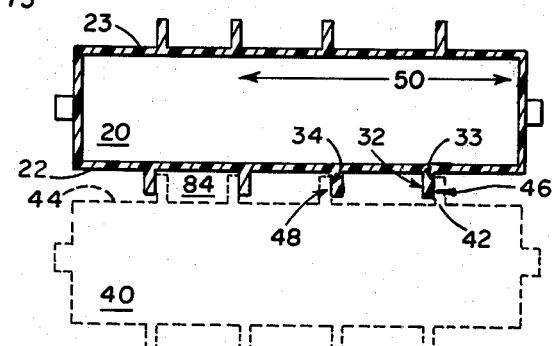
FIG. 3 includes the features of the present invention in a cross-sectional view of FIG. 2 along the lines III- —III with an adjacent container engaging one side of the container.

FIG. 3 is the cross-sectional view of FIG. 2 along the lines III—III with an adjacent container 40, shown in phantom, engaging one side 22 of the container 20. The adjacent container 40 includes an adjacent rib 42 which is connected to and extends outwardly from an adjacent side wall 44. The contact surface 33 on container 20 engages the corresponding adjacent contact surface 46 on container 40 when the two containers engage each other. Simultaneously, contact surface 34 of the container 20 engages the corresponding adjacent contact surface 48 of the container 40. Thus, lateral movement in the horizontal direction across the face of the side wall 22, illustrated by arrows 50, would be restrained.

As shown in FIG. 2, contact surfaces 33 and 34 are included in the first plurality of ribs. As previously discussed, the cooperation of an adjacent container with these contact surfaces restrains lateral movement of the container in the direction illustrated by arrows 80. Thus, the first plurality of ribs is an example of the first means for restraining lateral movement in one direction.

The second plurality of ribs represented by rib-like end posts 64 and 67 have contact surfaces 75 and 77 which engage the contact surfaces of an adjacent container in a way similar to the cooperation between the contact surfaces of the first plurality of ribs. The contact surfaces of the second plurality of ribs restrain movement of the container in a direction generally perpendicular to the direction of the first plurality of ribs as shown by arrows 82. Specifically, contact surfaces 77 and 75 in engagement with contact surfaces corresponding to 73 and 79 on an adjacent facing container restrain relative longitudinal movement. Rotational movement of the container in a plane parallel to the side wall 22 of the container is also restrained.

It is possible to arrange the configuration of the ribs so that it will not matter which side wall is being engaged with the adjacent container. An example of such an embodiment is described by FIG. 2. Here, the ribs 72 and 74 are positioned for contact surfaces 76 and 78 to engage contact surfaces of the mating ribs on an adjacent container. The second plurality of ribs have a similar arrangement. The ribs 64 and 67 are positioned for contact surfaces 75 and 77 to engage with adjacent contact surfaces on an adjacent container. Similarly, ribs 65 and 66 are positioned for contact surfaces 73 and 79 to engage adjacent contact surfaces on an adjacent container. If each of the containers have this rib configuration present on both side walls, then it will not matter which of the side walls engage an adjacent container. The cross-sectional view of container 20 in FIG. 3 illustrates side wall 22 and the opposite side wall 23 both having the same rib configuration. The necessity of having a male-female configuration is eliminated. Thus, the containers are easier to manufacture and simpler to assemble.

An alternate way of describing the configuration shown in FIG. 2 is to bisect the container 20 with an axis 83 in the plane of the side wall 22. A projection or rib connected to the side wall 22 on one side of the axis 83 will have a mating member symmetrically positioned on the other side of the axis 83. Folding the side wall 22 of the container along the axis 83 will properly engage the projection or rib and its mating member in the desired mating relationship. For example, ribs 60 and 62 are symmetrically positioned relative to mating ribs 74 and 72 about an axis 83. If the side wall 22 were folded along axis 83, then contact surfaces 68 and 70 of the ribs would engage contact surfaces 78 and and 76 of the mating ribs. A mating relationship like that described in FIG. 3 is achieved.

Although a projection or rib and its mating member are symmetrically positioned about an axis, the mating relationship is the critical factor determining the exact position of the projection or rib and the mating member. For example, when the projections are in the shape of ribs, the rib and mating ribs are not positioned in perfect symmetry relative to the axis 83. Instead, the mating rib is slightly displaced so that the desired mating relationship between the contact surfaces is achieved. The mating relationship between a rib and a mating rib would be similar if the mating rib were located on an adjacent container. Thus, contact surface 76 and 78 would simply engage the contact surfaces of the mating ribs on an adjacent container when the two containers are brought together.

Another feature of the more preferred embodiment is the creation of passages or channels between the individual containers. A cross-sectional view of a channel 84 formed by the first plurality of ribs is illustrated in FIG. 3. A fluid such as air or water can easily flow without obstruction between the individual cells. The direction of the flow is illustrated in FIG. 2 as arrows 80 or arrows 82. Heating or cooling of the containers may be accomplished by use of a fluid. The size or design of the channels may be changed by modifying the size of the ribs or their arrangement. For example, the ribs may be arranged diagonally across the side wall.

The designs of the end walls 24 and 25 illustrated in FIGS. 1 and 2 are intended as examples. The end walls may be permanently sealed to the side walls or be detachable. The end walls may be generally planar or, as the more preferred embodiment shown in FIG. 1 depicts, may contain a resealable opening 28 allowing access to the container 20. When the container is used as a battery container, it becomes necessary to connect the terminals of the electrodes through the end walls. Any method may be used to allow this connection to take place through the end wall while maintaining the container in an otherwise sealed condition. Electrolyte can be added to the container through the resealable opening 28.

Figure 4:
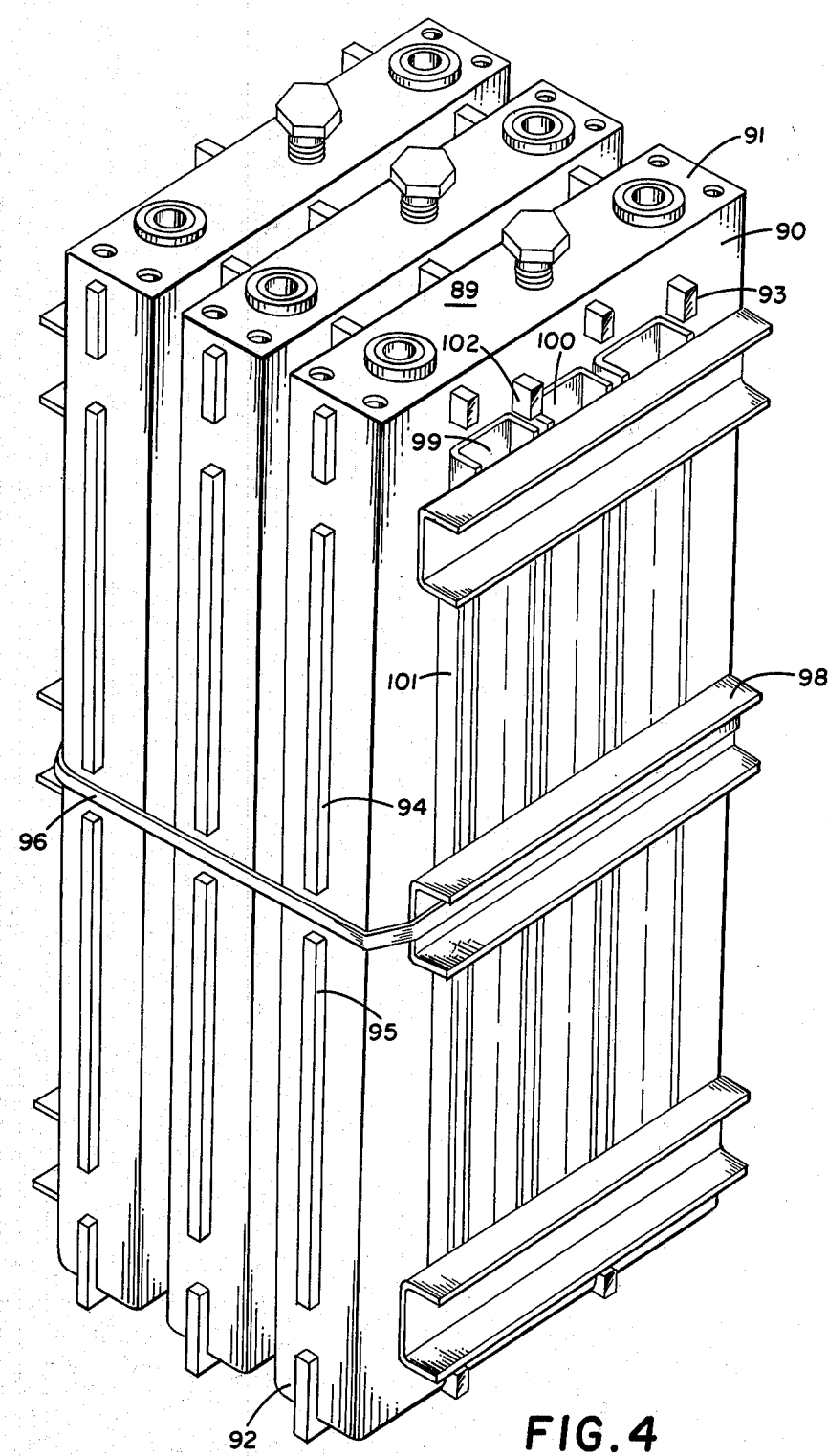
FIG. 4 is a perspective view of an assembly of containers including the features of the present invention.

FIG. 4 depicts a typical assembly of containers. Each of the containers includes side walls 90 and end walls 91 and 92 forming a generally rectangular shaped body. At least one of the side walls for each container has a projection 93 connected to it and extending outwardly therefrom. The containers are arranged side by side with the end walls generally coplanar and the side walls generally parallel. Means are included for restraining lateral and rotational movement of the containers in a plane parallel to the side walls. At least one of the side walls of each container is connected to the means. Means are also included for restraining movement perpendicular to the side walls of the containers. Additionally, battery electrodes may be housed in the container. The cooperation between the containers is similar to that explained throughout the specification. The perpendicular restraining means prevents movement of the cells in the direction perpendicular to the side wall. This may be accomplished by specifically restraining each of the individual containers or only the end containers. An example of restraining the individual containers would be to clip together the end walls of each container.

It is of particular importance to note that the assembly of containers is self-supporting. No other support is necessary if the movement between the containers is restrained in the direction perpendicular to the side wall. This is emphasized by the fact that only the end containers of an assembly need be restrained. An example of restraining only the end containers is to fit the assembly of containers between two objects which abut only the end containers. The containers located between the end containers do not have to be supported at any of the end walls.

The more preferred embodiment is another example of the perpendicular restraining means where a band 96 is used to encircle the containers. Thus, the containers are prevented from separating from each other in a direction perpendicular to the side walls of the containers. The end wall 92 may be effectively utilized to facilitate receiving and holding the band 96 in a desired position between the ribs 94 and 95 shown in FIG. 4.

FIG. 4 also illustrates a more preferred embodiment where an end plate is used to engage the container while simultaneously engaging the band 96. The folded members 99 and 100 of the end plate 98 fit between the ribs 101 extending outwardly from the side wall 90. This engagement limits the movement of the container in the horizontal direction. Blocks, not shown, are welded to the end plate 98 in the space between the folded members 99 and 100. The blocks abut ribs like 102 and limit movement in the vertical direction. The force that the band exerts against the end container is more evenly distributed across the length and width of the side wall 90 through folded members such as 99. Although it is desirable for the end plate 98 to cooperate with the means for restraining lateral movement, it should be understood that the present invention is not intended to be so limited. Also, one may find it convenient to use the end plate in combination with other features such as handles.

As demonstrated by these embodiments, this invention provides an improved means for supporting two or more containers together in an assembly. This is accomplished by restraining lateral and rotational movement parallel to a side wall while simultaneously allowing relatively unhindered movement perpendicular to the side wall. Yet, an individual container may be easily and economically produced. This is particularly true if the means includes a projection which can be used in the molding or formation process of the container.

These embodiments also show that the present invention provides a simple, economical assembly of containers. The assembly is able to support various members of containers. Additionally, the assembly is not dependent upon the size or shape of the containers themselves. Because of the relatively few parts involved, assembly is quick and easy. This also allows for easy replacement of an individual container in an assembly once the means restraining movement perpendicular to the side walls of the container is removed.

The present invention also provides for passages or channels for a fluid to flow between adjacent containers in an assembly. Even though channels may exist between the containers, swelling of the side walls is prevented by the ribs providing uniform resistance against the face of each side wall. Thus, when the containers house objects like battery electrodes, the breaking of the electrodes from swelling will be prevented.

What is claimed is:

1. An assembly of battery cell containers stacked together with side walls in facing engagement adapted to prevent relative movement of containers in planes parallel to the side walls and further adapted to provide longitudinal channels for coolant flow between adjacent facing side walls, each of said containers comprising:

a pair of oppositely facing parallel side walls of generally rectangular shape and pairs of oppositely facing end walls defining an internal chamber for an electrochemical cell requiring cooling;

each of said side walls having rectangular external surfaces at the side surfaces of the container facing the corresponding side surface of an adjacent container;

each of the side surfaces having a first and a second plurality of ribs projecting perpendicularly therefrom with surfaces contiguous to corresponding rib surfaces on an adjacent container side surface;

said first plurality of ribs including enlongated first and second pairs of ribs longitudinally coextending along each side surface of each container, the first pair of ribs laterally spaced apart sufficiently to receive the second pair of ribs of an adjacent facing side surface between said first pair in coextensive contact at longitudinal rib surfaces perpendicular to the side surface of the container whereby relative lateral and rotational motion in planes parallel to the container side surfaces are restrained, and whereby longitudinal channels for coolant flow are provided between the ribs of the second pair;

said second plurality of ribs including first and second pairs of rib-like end posts at both outer lengthwise margins of the side surface beyond the length of the first plurality of ribs, each end post of both the first and second pairs being longitudinally offset from the other end post in the pair such that the first pair of end posts receives the second pair of end posts on an adjacent facing side surface in contact at lateral post surfaces perpendicular to the container side surface and perpendicular to the longitudinal rib surfaces of said first plurality whereby relative longitudinal and rotational motion in planes parallel to the container side surfaces are restrained.

2. A container having side and end walls defining a chamber of generally rectangular cross section for an electrochemical cell requiring cooling comprising:

a pair of parallel side walls with oppositely facing rectangular external surfaces provided with substantially identical patterns of projections including first and second plurality of ribs, wherein said container may engage another adjacent container with said pattern of projections at side surfaces in a stack of containers to restrain relative movement in a plane parallel to said side surfaces;

said first plurality of ribs including elongated first and second pairs of ribs longitudinally coextending along both side surfaces, the first pair of ribs spaced laterally apart sufficiently to receive the second pair of ribs of an adjacent container between and in coextensive contact with the first pair at longitudinal rib surfaces perpendicular to the container side surface;

said second plurality of ribs including first and second pairs of rib-like end posts at both outer lengthwise margins of the side surfaces beyond the length of the first plurality of ribs, each end post of both the first and second pairs are longitudinally offset from the other end post in the pair such that the first pair of end post will receive a second pair of end posts of an adjacent container in contact at lateral post surfaces perpendicular to the container side surface and perpendicular to the longitudinal rib surfaces of the first plurality of ribs.

* * * * *